United States Patent [19]

Stone et al.

[11] Patent Number: 5,547,056
[45] Date of Patent: Aug. 20, 1996

[54] OIL DAM COUPLING

[75] Inventors: Dwight V. Stone; Charles E. Whalen, both of East Peoria, Ill.

[73] Assignee: Caterpillar Inc., Peoria, Ill.

[21] Appl. No.: 368,464

[22] Filed: Jan. 4, 1995

[51] Int. Cl.$^6$ .............. F16D 47/06; F16D 3/80
[52] U.S. Cl. .......... 192/51; 192/55.4; 192/58.2; 464/24; 74/730.1
[58] Field of Search .......... 192/48.4, 51, 55.2, 192/55.3, 55.4, 57, 58.2, 58.3, 58.4; 74/411, 376, 730.1; 464/24; 417/319

[56] References Cited

U.S. PATENT DOCUMENTS

| | | | |
|---|---|---|---|
| 2,738,660 | 3/1956 | Gail | 464/24 |
| 2,953,034 | 9/1960 | Weaver | 192/51 X |
| 3,898,813 | 8/1975 | Calistrat . | |
| 4,378,711 | 4/1983 | Daniel . | |
| 4,677,866 | 7/1987 | Tone | 74/15.86 |
| 4,794,807 | 1/1989 | Horii et al. | 74/15.84 |

FOREIGN PATENT DOCUMENTS 2117089  10/1983  United Kingdom .

*Primary Examiner*—Richard M. Lorence
*Attorney, Agent, or Firm*—Calvin E. Glastetter

[57] ABSTRACT

An oil dam coupling for connecting an output shaft of a transmission arrangement to an input shaft of a pump assembly. The oil dam coupling includes a first member splined to the output shaft and a second member splined to the input shaft. The first member has an end plate which forms a cavity and retains oil within the cavity. The second member engages the first member within the cavity. The oil interacting between the first member and the second member within the cavity will reduce torsional wrap of the output shaft and reduce noise.

7 Claims, 2 Drawing Sheets

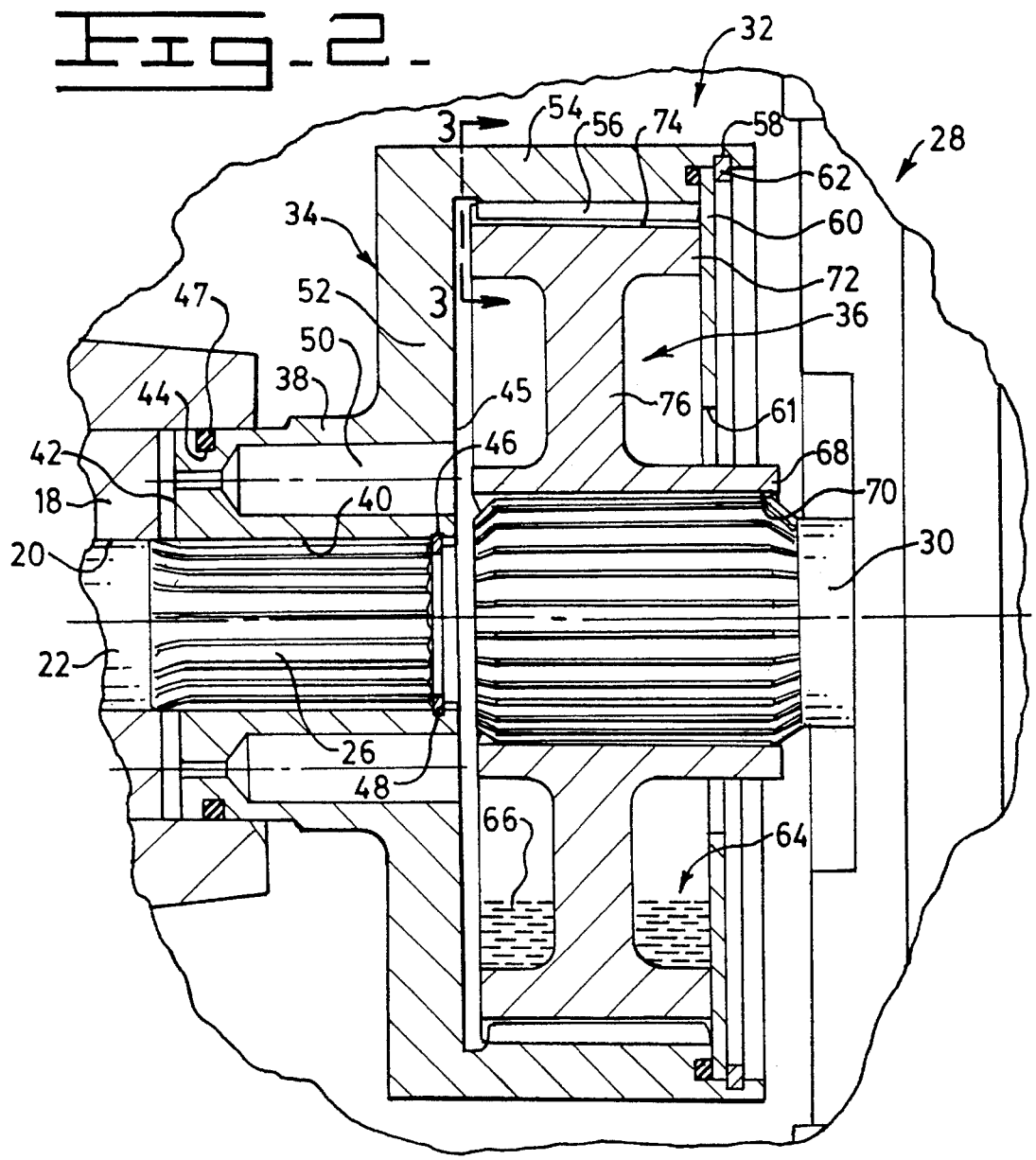
Fig_2_
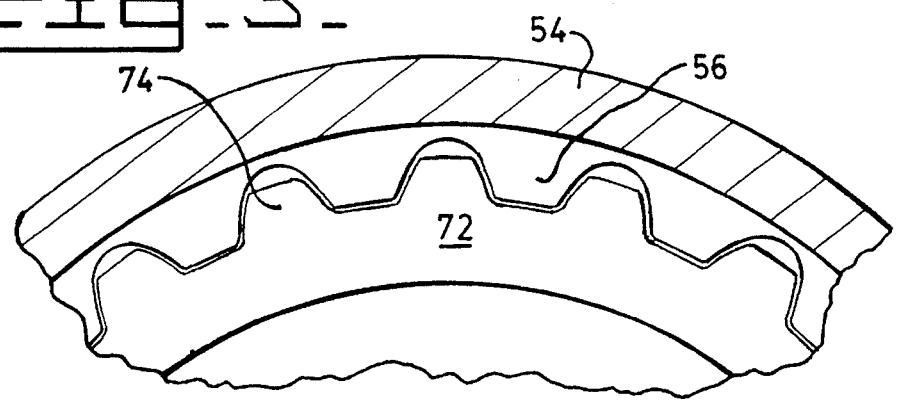
Fig_3_

OIL DAM COUPLING

TECHNICAL FIELD

This invention relates generally to a transmission arrangement and more particularly to a coupling for connecting a shaft of the transmission to a pump drive.

BACKGROUND ART

It is known to connect an output shaft to an auxiliary pump assembly. However when the shaft is fairly long or small diameter the shaft could have a high torsional wrap, large torque spikes and be noisy. Under certain conditions such as low pump load or high engine speed the torsional vibration could damage the shaft or pump assembly.

The present invention is directed to overcoming one or more of the problems as set forth above.

DISCLOSURE OF THE INVENTION

In one aspect of the present invention a transmission arrangement has a coaxial pump drive. The transmission arrangement includes a forward-reverse clutch arrangement which is rotatably positioned within the transmission arrangement. A shaft extends axially through the clutch arrangement. The shaft has an input end and an output end. A pump assembly is mounted on the transmission arrangement and has an input shaft which is axially aligned with the shaft through the clutch assembly. An oil dam coupling is connected between the shaft and the input shaft of the pump assembly.

The present invention provides an oil dam coupling which reduces torque spikes and noise associated with the transmission shaft. The coupling will reduce torsional wrap in the transmission shaft. The coupling includes a first member splined to the transmission shaft and having internal teeth. The coupling further includes a second member splined to the pump shaft and having external teeth which interact with the internal teeth of the first member. A plate is provided to form an oil retaining cavity. The oil will interact between the internal and external teeth to reduce torque spikes, vibration and noise.

BRIEF DESCRIPTION OF THE DRAWINGS

FIG. 2 is an enlarged cross section of the present invention.

FIG. 3 is a section view taken along line 3—3 of FIG. 2.

BEST MODE FOR CARRYING OUT THE INVENTION

Figure 1:
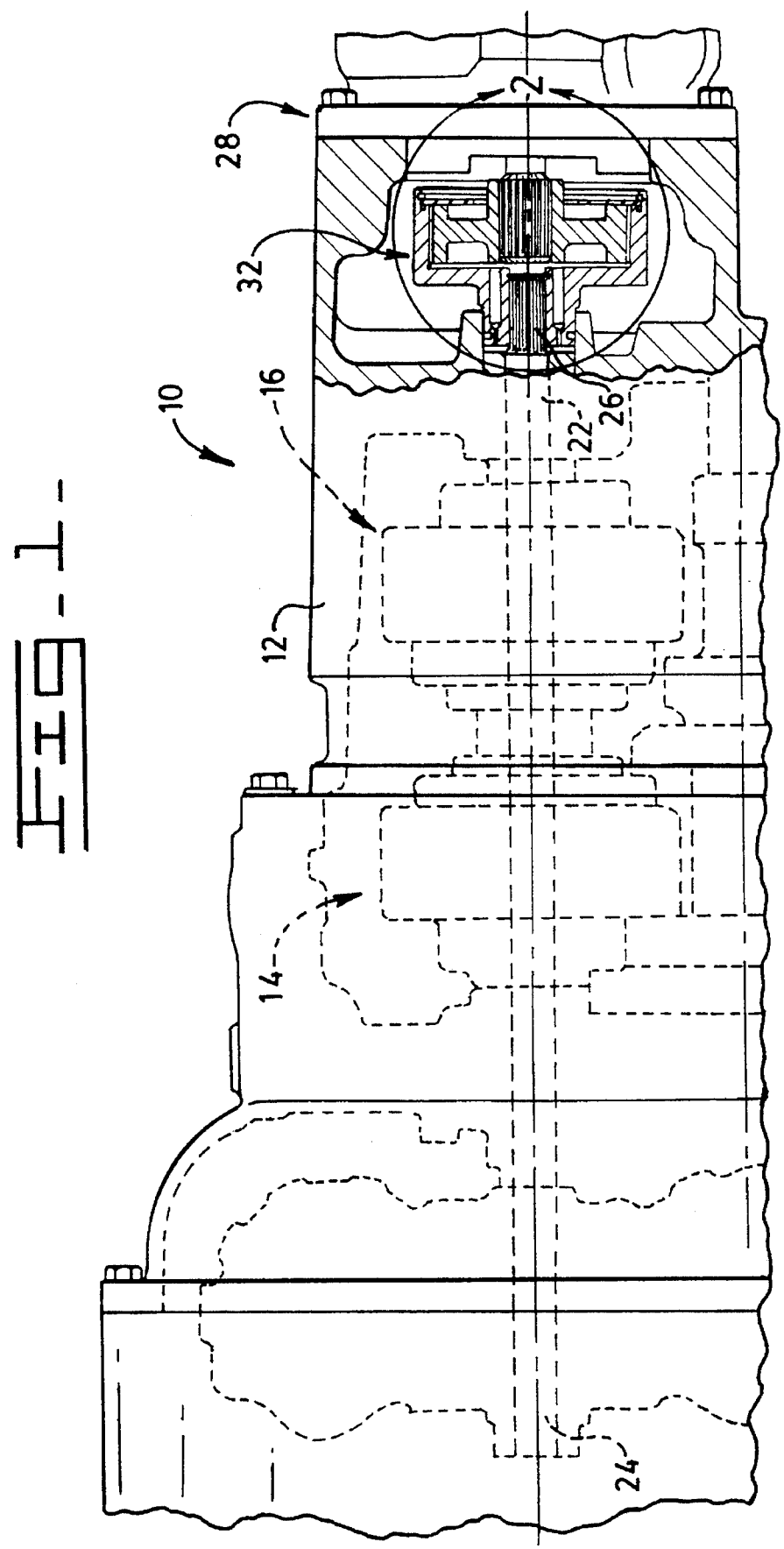
FIG. 1 is a sectional view of a transmission with the present invention shown in cross section.

A transmission arrangement 10 is shown in FIG. 1 as having a housing 12. A forward clutch 14 and a reverse clutch 16 are rotatably positioned and arranged along a common central transmission input shaft 18. The input shaft 18 has an axial central bore 20 therethrough. A pump drive power shaft 22 is positioned within the axial center bore 20 of the transmission input shaft 18. The power shaft 22 has an input end 24 and an output end 26. A pump assembly 28 is removably attached to the housing 12. The pump assembly 28 includes an input shaft 30 which is axially aligned with the pump drive power shaft 22.

As best shown in FIG. 2, an oil dam coupling 32 connects the pump drive power shaft 22 to the input shaft 30 of the pump assembly 28. The oil dam coupling 32 includes a first member 34 which is connected to the pump drive power shaft 22 and a second member 36 which is connected to the input shaft 30. The first member 34 includes an inner hub 38 connected to the power shaft 22 by a spline 40. The inner hub 38 has a first end portion 42 having an external seal groove 44 and a second end portion 45 having an internal snap ring groove 46. A seal 47 is positioned within the seal groove 44 for sealing between the first member 34 and the housing 12. A snap ring 48 is positioned within the groove 46 to position the first member 34 on the power shaft 22. An oil passage 50 extends axially through the inner hub 38. A wall 52 extends radially outwardly from the second end portion 46. The first member 34 includes an outer hub 54 which extends from the wall 52 toward the pump assembly 28 parallel with the inner hub 38. The outer hub 54 includes internal spline teeth 56. The extending portion has an internal snap ring groove 58. A washer shaped end plate 60 is positioned within the outer hub 54 between the gear teeth 56 and the snap ring groove 58. The washer shaped plate 60 has an inner diameter 61 which is radially spaced from the second member 36. A snap ring 62 is positioned within the groove 58 to retain the end plate 60 in position. The plate 60, in this application, is shown to be retained by a snap ring 62, however the plate 60 could be retain in other suitable means such as bolts. The wall 52, the outer hub 54 and the end plate 60 form a cavity 64 for maintaining a supply of oil 66. The end plate 60 forms a dam for maintaining a predetermined level of oil 66. The second member 36 includes an inner hub 68 connected to the pump input shaft 30 by a spline 70. An outer hub 72 is positioned within the cavity 64 of the first member 34. The outer hub 72 includes external spline teeth 74 which interact with the internal teeth 56 of the first member 34. A web 76 extends between the inner hub 68 and the outer hub 72.

INDUSTRIAL APPLICABILITY

In use of the present transmission arrangement 10 the pump drive power shaft 22 transmits torque from the input, such has an engine flywheel, to the pump assembly 28. The oil dam coupling 32 connects the pump drive power shaft 22 to the input shaft 30 of the pump assembly 28. The first member 34 is splined to the pump drive power shaft 22 and includes a cavity 64. The outer hub 72 of the second member 36 is positioned within the cavity 64. Oil 66 from within the transmission housing 12 enters the cavity 64 through the oil passage 50. Oil 66 floods and fills the cavity 64 to a predetermined depth as defined by the inner diameter 61 of the end plate 60. Oil 66 within the cavity 64 surround the gear teeth 56, 74 and provide a cushion between adjacent teeth to reduce torsional wrap in the power shaft and also reduce torque spikes and noise. Oil 66 will be displaced from one side of a spline tooth to the other side filling any voids to cushion the coupling.

We claim:

1. A transmission arrangement having a coaxial pump drive, comprising:

a forward-reverse clutch arrangement rotatably positioned within the transmission arrangement, the forward-reverse clutch arrangement having a axial center bore therethrough;

a shaft extending axially through the axial center bore of the forward-reverse clutch arrangement, the shaft having an input end and an output end;

a pump assembly mounted on the transmission, the pump assembly having an input shaft axially aligned with the shaft of the clutch arrangement; and an oil dam coupling connected between the output end of the shaft of the clutch arrangement and the input shaft of the pump assembly.

2. The transmission arrangement of claim 1 wherein the oil dam coupling includes a first member and a second member.

3. The transmission arrangement of claim 2 wherein the first member has an inner hub splined to the shaft of the clutch arrangement and includes an outer hub having internal spline teeth an end wall which extends between the inner and outer hubs.

4. The transmission arrangement of claim 2 wherein the second member has an inner hub splined to the input shaft of the pump assembly and an outer hub having external teeth which interact with the internal teeth of the first member.

5. The transmission arrangement of claim 4 wherein the oil dam coupling includes an annular end plate having an outer diameter interacting with the outer hub of the first member and extending therefrom toward tile inner hub of the second member.

6. The transmission arrangement of claim 5 wherein the end wall of the first member, the outer hub of the first member and the annular end plate form an oil receiving cavity.

7. The transmission arrangement of claim 6 wherein the oil interacts between the teeth of first and second members to dampen torsional vibration and loads.

* * * * *

UNITED STATES PATENT AND TRADEMARK OFFICE
CERTIFICATE OF CORRECTION

PATENT NO. : 5,547,056

DATED : August 20, 1996

INVENTOR(S) : Stone et al.

It is certified that error appears in the above-identified patent and that said Letters Patent is hereby corrected as shown below:

Claim 5, column 4, line 6, delete "tile" and insert --the--.

Signed and Sealed this

Third Day of December, 1996

Attest:

BRUCE LEHMAN

*Attesting Officer*  *Commissioner of Patents and Trademarks*